United States Patent [19]
Kurosawa

[11] Patent Number: 5,198,946
[45] Date of Patent: Mar. 30, 1993

[54] HEAD DRIVE MECHANISM USING NON-AXIAL LEAD SCREW IMPARTED MOTION

[75] Inventor: Yuichi Kurosawa, Tokyo, Japan

[73] Assignee: Asahi Kogaku Kogyo Kabushiki Kaisha, Tokyo, Japan

[21] Appl. No.: 928,185

[22] Filed: Aug. 14, 1992

Related U.S. Application Data

[63] Continuation of Ser. No. 584,048, Sep. 18, 1990, abandoned.

[30] Foreign Application Priority Data

Sep. 22, 1989 [JP] Japan ................... 1-247106

[51] Int. Cl.⁵ .................. G11B 5/54; F16H 25/14
[52] U.S. Cl. ...................... 360/105; 360/75; 360/109; 74/89.14; 74/89.15; 369/223
[58] Field of Search .............. 360/75, 105, 109; 74/89.14, 89.15; 369/220, 221, 223

[56] References Cited

U.S. PATENT DOCUMENTS

| | | | |
|---|---|---|---|
| 4,333,116 | 6/1982 | Schoettle et al. | 74/89.15 |
| 4,652,952 | 3/1987 | Maeda | 360/106 |
| 4,667,524 | 5/1987 | Kozawa et al. | 74/89.15 |
| 4,864,445 | 9/1989 | Tezuka | 360/105 |
| 5,073,832 | 12/1991 | Ohashi et al. | 360/75 |

FOREIGN PATENT DOCUMENTS

| | | |
|---|---|---|
| 3533471 | 3/1986 | Fed. Rep. of Germany ...... 360/105 |
| 64-14785 | 1/1989 | Japan ............................ 360/105 |
| 804441 | 11/1955 | United Kingdom . |
| 1467218 | 3/1977 | United Kingdom . |
| 1599053 | 9/1981 | United Kingdom . |

Primary Examiner—Joseph L. Dixon
Assistant Examiner—David L. Robertson
Attorney, Agent, or Firm—Sandler Greenblum & Bernstein

[57] ABSTRACT

A head drive mechanism associated with a disk drive device is provided for driving to rotate a magnetic disk. A magnetic head is driven and a signal is recorded on the magnetic disk or a signal already recorded on the disk is reproduced. The head is mounted on a carriage, on which a protrusion is provided, and is driven in a direction parallel to the surface of the disk with the protrusion being engaged with a lead screw when the lead screw is rotated. When the carriage abuts against a stopper located at a predetermined position, the movement of the head in the radial direction of the disk is prevented. A control system further controls rotation of the screw in the direction parallel to the surface of the disk such that the carriage is held abutting against the stopper. Since the protrusion is forced against the thread portion of the screw, the head is moved away from the disk.

15 Claims, 5 Drawing Sheets

HEAD DRIVE MECHANISM USING NON-AXIAL LEAD SCREW IMPARTED MOTION

This application is a continuation of application Ser. No. 07/584,048, filed Sep. 18, 1990, now abandoned.

BACKGROUND OF THE INVENTION

The present invention relates to a head drive mechanism for magnetic disk drive device.

Electronic still video cameras are designed so that magnetic heads are used for recording or reproducing video signals onto or from video floppy disks (magnetic disks). While the magnetic disk is not rotated, it may be deformed if the magnetic head is kept abutting thereagainst for a long time. In such a case, the disk drive system is designed to retract the magnetic head from the magnetic disk.

Conventionally, an actuator or the like has been employed to retract the magnetic head from the magnetic disk.

Notwithstanding, the disadvantage pertaining to the use of such an actuator is that the disk drive tends to become not only complicated in construction and large-sized, but also costly.

SUMMARY OF THE INVENTION

It is therefore an object of the present invention to provide an improved head drive mechanism simple in construction in that a head is made retractable from a disk without adding a special mechanism thereto.

According to the present invention, there is provided a head drive mechanism associated with a disk drive device, a disk being mounted and driven to be rotated on the disk device. The head drive mechanism comprises a head member capable of recording signals on the disk and reproducing the same from the disk. The head drive mechanism further comprises a rotary shaft extending in the direction parallel to the surface of said disk and having a helical groove formed on the circumferential surface thereof, the helical groove being provided with an inclined sectional surface.

A support member carries the head member thereon and is provided with an engaging member. The support member is movable in a direction parallel to the surface of the disk, and the engaging member is engaged in the helical groove of the rotary shaft in such a fashion that the support member is moved in parallel with the surface of the disk upon rotation of the rotary shaft.

A stopper member is provided for preventing the sliding movement of the support member in the direction parallel to the surface of the disk at a predetermined position.

Control means are further provided for controlling rotation of the rotary shaft in such a fashion that the rotary shaft is further rotated by a predetermined amount after the movement of the support member is stopped by the stopper member. This is done so that the engaging member is forced to be moved away from the disk at the predetermined position due to sliding contact of the engaging member with the inclined sectional surface of the helical groove.

According to another aspect of the invention, there is provided a head drive mechanism associated with a disk drive device. A disk is mounted and driven to be rotated on the disk drive device, and the head drive mechanism comprises a head member capable of recording signals on the disk and reproducing the same from the disk. The head mechanism further comprises a lead screw extending in parallel with the surface of the disk, the thread of the lead screw having an inclined sectional surface. A support member carries the head member thereon and is provided with an engaging member on one end thereof. The engaging member engages with the lead screw in such a fashion that the support member is moved in the direction parallel to the surface of the disk upon rotation of the lead screw.

A guide member is provided for guiding the support member in the direction parallel to the surface of the disk, and for pivoting the other end of the support member such that the one end of the support member is swingable in a direction orthogonal to the guiding direction of the guide member.

A stopper member is provided for preventing the sliding movement of the support member in the direction parallel to the surface of the disk at a predetermined position.

Control means are also provided for controlling rotation of the lead screw in such a fashion that the lead screw is further rotated at a predetermined amount after the movement of said support member is stopped by said stopper member, so that said support member is forced to be moved away from the disk at said predetermined position due to sliding contact of the engaging member with the thread of the lead screw.

Optionally, the head drive mechanism further comprises a biasing member for biasing the engaging member to be neutrally engaged with the lead screw.

Further, the control means comprises detect means for detecting that the support member is located at the predetermined position.

DESCRIPTION OF THE ACCOMPANYING DRAWINGS

DESCRIPTION OF THE EMBODIMENTS

Figure 1:
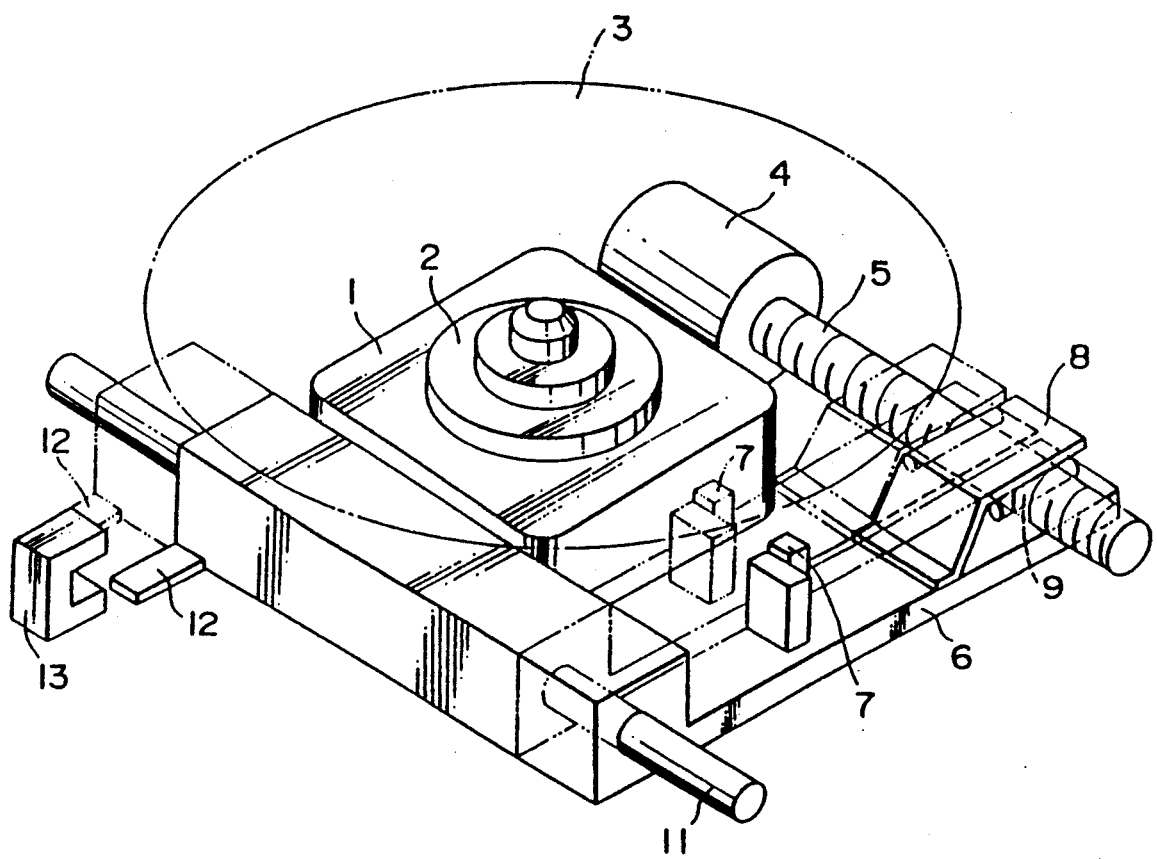
FIG. 1 is a perspective view of a disk drive device provided with a head drive mechanism embodying the present invention.

FIG. 1 is a perspective view of a disk drive device provided with a head drive mechanism embodying the present invention.

As shown in FIG. 1, the disk drive device comprises a spindle motor 1 used for rotating a flywheel (spindle chuck) 2, a video floppy disk 3 mounted and chucked on the flywheel 2 for being rotated and used for recording or reproducing a video signal, a step motor 4 used for rotating a lead screw 5, and a carriage 6 on which a magnetic head 7 is mounted.

The component parts further include a needle 9 as a mating part secured on the carriage 6 to be engaged with the lead screw 5; a plate spring 8 as a resilient member secured to the carriage 6, the plate spring 8 being used for biasing the carriage 6 in such a manner that the needle 9 is pressed against the lead screw 5; and a guide bar 11 used for guiding the carriage 6 in its extending direction.

In addition, a projection 12 is secured to the carriage 6 and arranged so that it passes the position opposite to a detection portion of a photocoupler 13 which is secured to a base plate (not shown).

Figure 2:
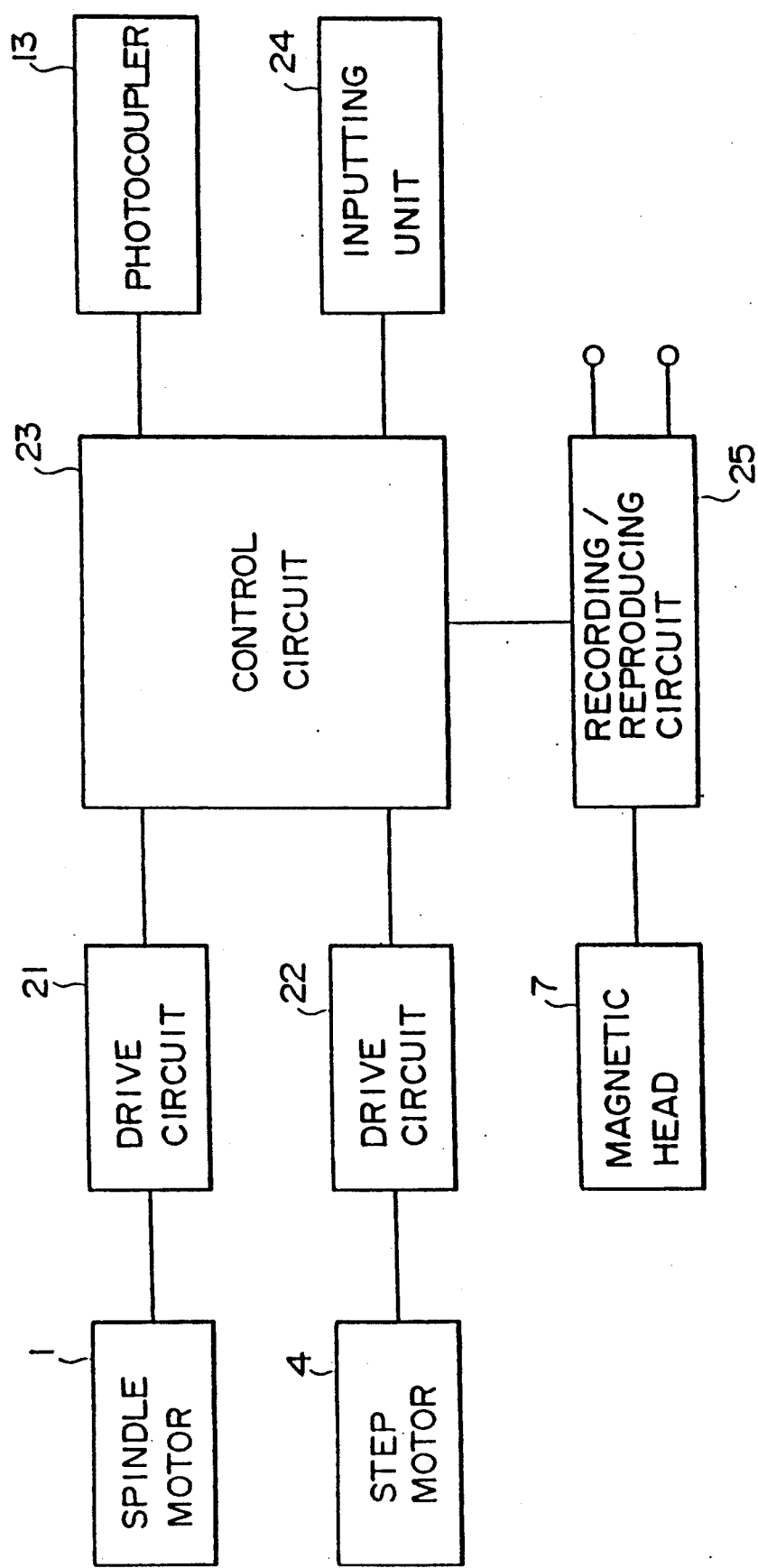
FIG. 2 is a block diagram of the head drive mechanism embodying the present invention.

FIG. 2 is a block diagram illustrating the configuration of the disk drive embodying the present invention.

As shown in FIG. 2, drive circuits 21, 22 are used for driving the spindle motor 1 and the step motor 4, respectively. A control circuit 23 comprises a microcomputer or the like and controls each of the circuits in correspondence with the operation of an input circuit 24 having switches or buttons. A recording/reproducing circuit 25 receives a signal, modulates it, and supplies the modulated signal to the magnetic head 7. Moreover, the recording/reproducing circuit 25 demodulates the signal reproduced from the magnetic head 7 and outputs the demodulated signal.

Figure 3:
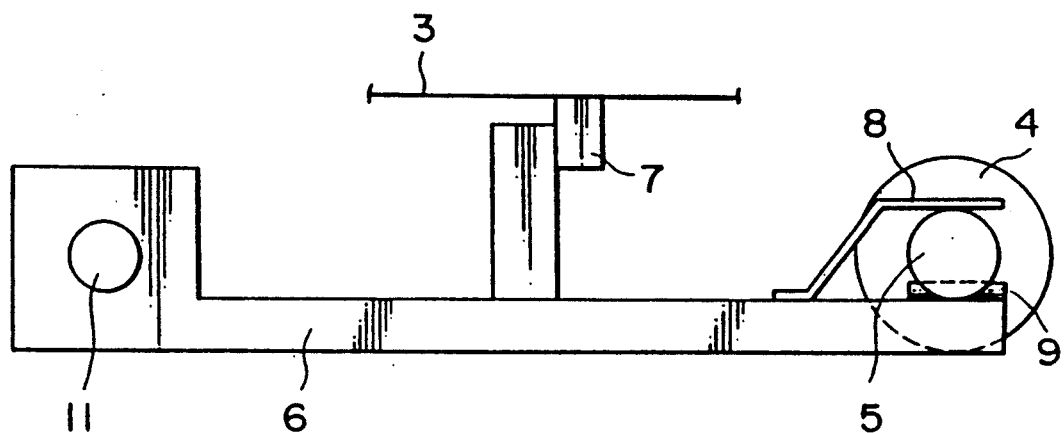
FIG. 3 is a side view of the magnetic disk and the head drive mechanism embodying the present invention while the magnetic disk is kept abutting against a video floppy disk.
Figure 4:
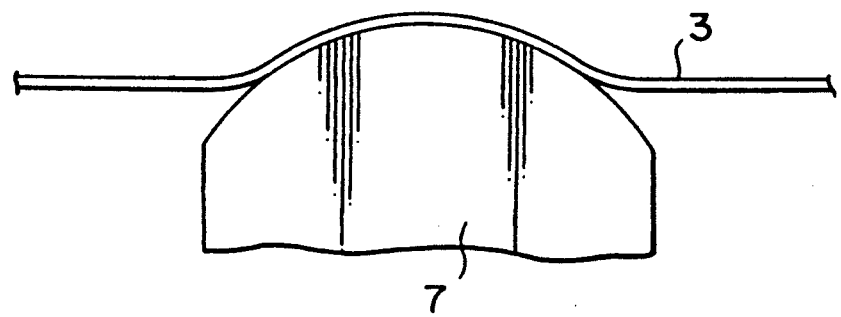
FIG. 4 is an enlarged side view illustrating the disk kept abutting against the video floppy disk.

When the input circuit 24 is operated, for example, to instruct recording a signal, the control circuit 23 drives the spindle motor 1 via the drive circuit 21, thereby rotating the video floppy disks 3. The control circuit 23 also drives the step motor 4 via the drive circuit 22, thereby rotating the lead screw 5. As the needle 9 is kept engaged with the lead screw 5, the carriage 6 on which the needle 9 is secured is moved while being guided by the guide bar 11. As a result, the magnetic head 7 fixed to the carriage 6 is moved in the direction parallel to the surface of the video floppy disk 3 and caused to face a predetermined track. At this time, as shown in FIGS. 3 and 4, the magnetic head 7 contacts the video floppy disks 3, whereas the video floppy disk 3 resiliently deforms in such a manner that its contact part slightly protrudes to the other side.

The video signal received from the circuit (not shown) is modulated in the recording/reproducing circuit 25, and the signal thus modulated is supplied to the magnetic head 7. In this way, the video signal is recorded on a predetermined track of the video floppy disk 3.

When reproduction is instructed, the magnetic head 7 and the video floppy disk 3 are driven as above. Then the video signal reproduced by the magnetic head 7 is demodulated in the recording/reproducing circuit 25 before being delivered to a display such as a CRT (not shown).

When a stopping of the recording or reproducing operation is instructed, the control circuit 23 stops driving the drive circuit 21 so as to stop the rotation of the spindle motor 1. The control circuit 23 then drives the step motor 4 via the drive circuit 22 to make the carriage 6 move in the direction parallel to the surface of the video floppy disk 3 toward the inner (or outer) peripheral of the video floppy disk 3.

When the carriage 6 is located at a predetermined position (inside the innermost peripheral track or outside the outermost peripheral track), it abuts against the cage of the spindle motor 1 (or the inner wall of the outer cover (not shown) of the disk drive, for instance, when the carriage 6 is moved in the outer peripheral direction) and stops thereat. When the carriage 6 reaches the predetermined position, the projection 12 is located opposite to the detection part of the photocoupler 13 and intercepts the light from the photocoupler 13. The control circuit 23 monitors the output of the detection part of the photocoupler 13 and detects its position.

When the control circuit 23 detects the predetermined position from the output of the detection part of the photocoupler 13, it further drives the step motor 4 slightly in the direction in which the carriage 6 abuts against the spindle motor 1. The needle 9 thus runs on the teeth of the lead screw 5.

Figure 5:
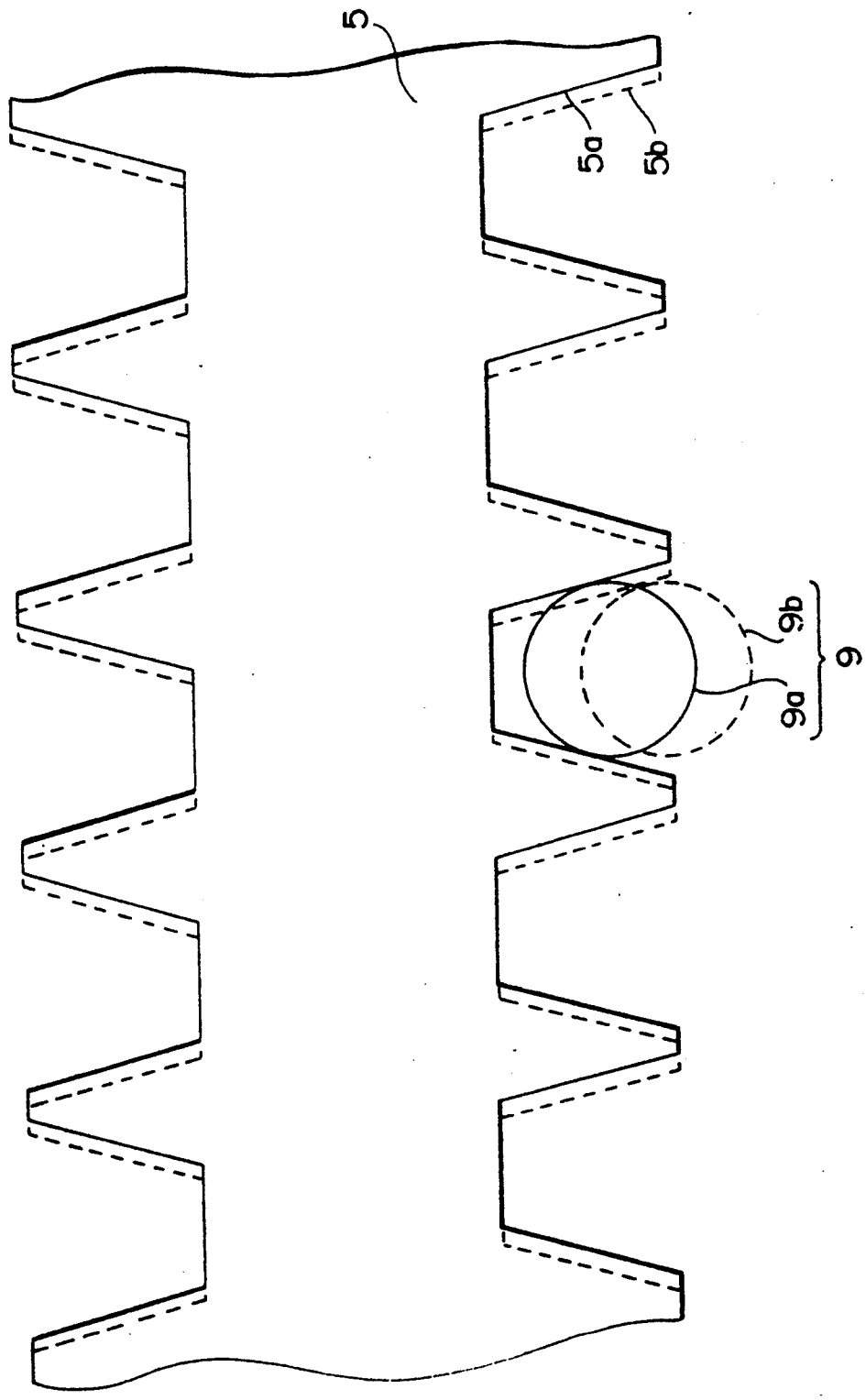
FIG. 5 is a sectional view illustrating the relation between a lead screw and a needle in the head drive mechanism embodying the present invention.

More specifically, referring to FIG. 5, while the needle 9a is being driven normally, it remains in contact with both the front and rear teeth of the lead screw 5a as shown by a solid line of FIG. 5. When the needle 9b is driven to the predetermined position where the carriage 6 abuts against the stopper, it runs only on the rear teeth of the lead screw 5b as shown by a dotted line of FIG. 5 (i.e., it moves downward in FIG. 5).

Figure 6:
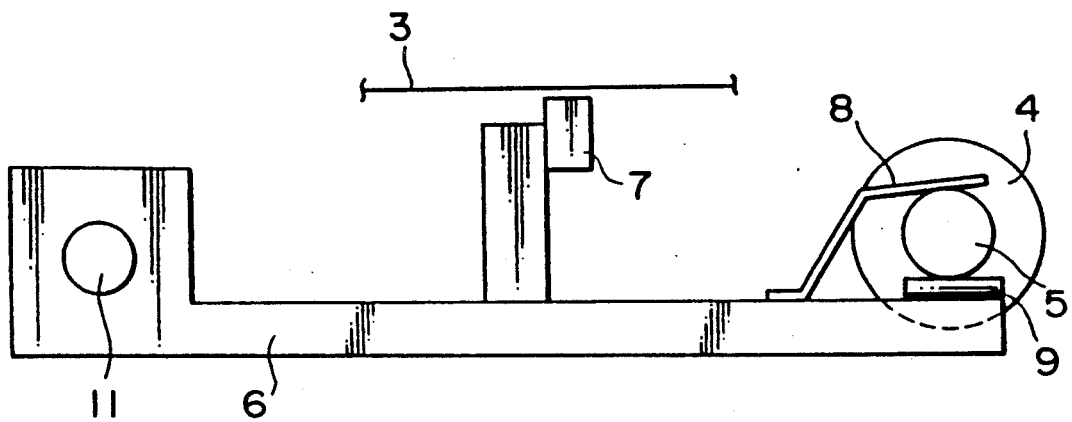
FIG. 6 is a side view illustrating the magnetic head retracted from the video floppy disk in the head drive mechanism embodying the present invention.
Figure 7:
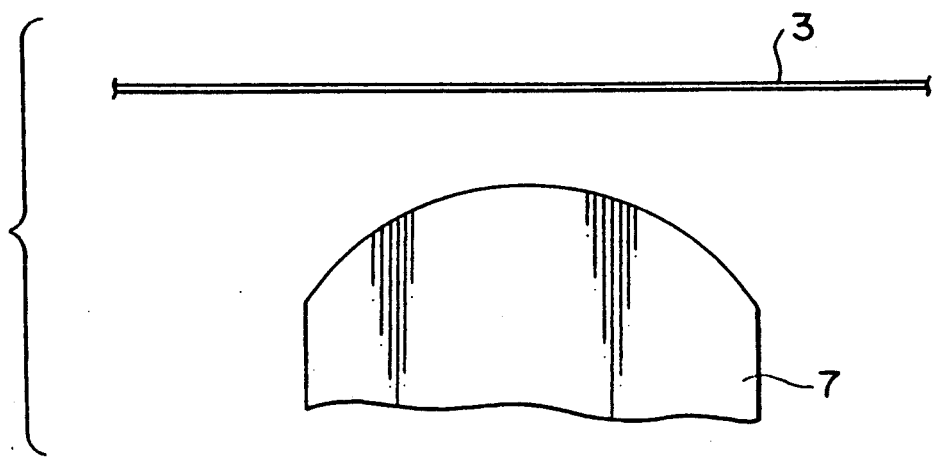
FIG. 7 is an enlarged side view illustrating the magnetic head retracted from the video floppy disk.

As a result, the carriage 6 slightly revolves clockwise about the guide bar 11 against the biasing force of the plate spring 8 as shown in FIG. 6. The magnetic head 7 thus detaches from the video floppy disk 3 as shown in FIG. 7, as an enlarged view of FIG. 6.

Although the lead screw is employed to transmit the driving force to the carriage in the embodiment above, the lead screw can be substituted with a rotary shaft provided with a helical groove having an inclined sectional surface on its circumferential surface.

Although the needle has been employed as the engaging part in the embodiment shown, a ball or the like may be used. Although the plate spring has been employed as the resilient member, moreover, rubber, a coil spring, or the like, may be used.

Although the disk drive according to the present invention has been described as what is applicable to an electronic still video camera, for instance, the disk drive according to the present invention may be applicable to other apparatus.

In the disk drive according to the present invention, the lead screw is further driven when the carriage is further moved slightly in the direction in which the carriage abuts against the stopper when the carriage abuts thereagainst as stated above. The engaging part is consequently caused to run on the lead screw so as to make the carriage rock, so that the head is simply detached from the disk without adding a special mechanism as represented by an actuator or the like.

What is claimed is:

1. A head drive mechanism associated with a disk driving device, a disk being mounted and driven to be rotated on said disk drive device, said head drive mechanism comprising a head member capable of recording signals on said disk and reproducing the same from said disk, said head drive mechanism further comprising:

a rotary shaft extending parallel to the surface of said disk and having a helical groove formed on a circumferential surface of said shaft, said helical groove being provided with an inclined sectional surface;

a support member carrying said head member thereon and provided with an engaging member, said support member being movable in a direction parallel to said surface of said disk, said engaging member being engaged in said helical groove of said rotary shaft in such a fashion that said support member is moved in the direction parallel to said surface of said disk upon rotation of said rotary shaft;

a stopper member for preventing the sliding movement of said support member in the direction parallel to said surface of said disk at a predetermined position; and control means for controlling rotation of said rotary shaft in such a fashion that said rotary shaft is further rotated by a predetermined amount after the movement of said support member is stopped by said stopper member so that said support member is forced to be moved away from said disk at said predetermined position due to sliding contact of said engaging member with said inclined sectional surface of said helical groove.

2. The head drive mechanism according to claim 1, which further comprises a biasing member for biasing said engaging member to be neutrally engaged with said helical groove.

3. The head drive mechanism according to claim 1, which further comprises guide means for guiding said support member so that said head member is moved in a radical direction of said disk.

4. The head drive mechanism according to claim 3, wherein said guide means comprises a cylindrical rod member, and wherein said support member has a hole extending along a direction in which said support member is moved, said rod member being engaged in said rod hole of said support member, whereby said support member is moved along said rod member, and said support member is capable of being rotated in a direction orthogonal to the extending direction of said rod member.

5. The head drive mechanism according to claim 1, wherein said disk device comprises a case member for accommodating a spindle motor for driving said disk member, and wherein said stopper member comprises a wall of said case member which extends in a direction parallel to the spindle of said spindle motor and is provided between said spindle motor and said head member.

6. The head drive mechanism according to claim 1, wherein said control means comprise detect means for detecting that said support member is located at said predetermined position.

7. The head drive mechanism according to claim 6, wherein said detect means comprise a fixedly disposed photocoupler and a light shield member provided on said supporting member, and wherein said light shield member shields the light of said photocoupler when said supporting member is located at said predetermined position.

8. The head drive mechanism according to claim 2, wherein said biasing means comprise a leaf spring, one end side portion of said leaf spring and said engaging member being arranged to nip said rotary shaft therebetween, the other end of said leaf spring being attached on said support member.

9. A head drive mechanism associated with a disk drive device, a disk being mounted and driven to be rotated on said disk drive device, said head drive mechanism comprising a head member capable of recording signals on said disk and reproducing the same from said disk, said head drive mechanism further comprising:

a lead screw extending in parallel with the surface of said disk, the thread of said lead screw having an inclined sectional surface;

a support member for carrying said head member thereon, provided with an engaging member on one end thereof, said engaging member being engaged with said lead screw in such a fashion that said support member is moved in a direction parallel to said surface of said disk upon rotation of said lead screw;

a guide member for guiding said support member in a direction parallel to said surface of said disk, and for pivoting the other end of said support member such that said one end of said support member is swingable in a direction orthogonal to the guiding direction of said guide member;

a stopper member for preventing the sliding movement of said support member in a direction parallel to said surface of said disk at a predetermined position; and control means for controlling rotation of said lead screw in such a fashion that said lead screw is further rotated by a predetermined amount, after the movement of said support member is stopped by said stopper member, so that said support member is forced to be moved away from said disk at said predetermined position due to sliding contacting of said engaging member with the thread of said lead screw.

10. The head drive mechanism according to claim 9, which further comprises a biasing member for biasing said engaging member to be neutrally engaged with said lead screw.

11. The head drive mechanism according to claim 9, wherein the support member has a hole at said other end thereof, and wherein said guide member comprises a rod member having a circular sectional surface, said rod member being fitted in said hole, whereby said support member is guided along said rod member as well as made swingable about said rod member.

12. The head drive mechanism according to claim 9, wherein said disk drive device comprises a case member for accommodating a spindle motor for driving said disk member, and wherein said stopper member comprises a wall of said case member which extends in parallel with the spindle of said spindle motor and is provided between said spindle motor and said head member.

13. The head drive mechanism according to claim 9, wherein said control means comprise detect means for detecting that said support member is located at said predetermined position.

14. The head drive mechanism according to claim 13, wherein said detect means comprise a fixedly disposed photocoupler and a light shield member provided on said supporting member, and wherein said light shield member shields the light of said photocoupler when said supporting member is located at said predetermined position.

15. The head drive mechanism according to claim 10, wherein said biasing means comprises a leaf spring, one end side portion of said leaf spring and said engaging member being arranged to nip said lead screw therebetween, the other end of said leaf spring being attached on said support member.

* * * * *

UNITED STATES PATENT AND TRADEMARK OFFICE
CERTIFICATE OF CORRECTION

PATENT NO. : 5,198,946
DATED : March 30, 1993
INVENTOR(S) : Y. KUROSAWA

It is certified that error appears in the above-indentified patent and that said Letters Patent is hereby corrected as shown below:

At column 5, line 24 (claim 3, line 4), change "radical" to —radial—.

Signed and Sealed this

Twelfth Day of November, 1996

BRUCE LEHMAN

Attest:

Attesting Officer     Commissioner of Patents and Trademarks